(12) United States Patent
Chang et al.

(10) Patent No.: US 8,062,751 B2
(45) Date of Patent: Nov. 22, 2011

(54) LOW BIOFOULING FILTRATION MEMBRANES AND THEIR FORMING METHOD

(75) Inventors: Yung Chang, Tao-Yuan (TW); Ruoh-Chyu Ruaan, Tao-Yuan (TW); Wen-Yih Chen, Tao-Yuan (TW); Akon Higuchi, Tao-Yuan (TW); Yan-Che Chiang, Tao-Yuan (TW); Juin-Yih Lai, Tao-Yuan (TW)

(73) Assignee: Chung Yuan Christian University, Tao-Yuan (TW)

( * ) Notice: Subject to any disclaimer, the term of this patent is extended or adjusted under 35 U.S.C. 154(b) by 906 days.

(21) Appl. No.: 11/963,406

(22) Filed: Dec. 21, 2007

(65) Prior Publication Data
US 2009/0162662 A1  Jun. 25, 2009

(51) Int. Cl.
*B32B 27/08* (2006.01)
*B32B 27/16* (2006.01)
*B32B 27/30* (2006.01)

(52) U.S. Cl. .......... 428/420; 428/421; 428/422; 428/522
(58) Field of Classification Search .................. None
See application file for complete search history.

(56) References Cited

U.S. PATENT DOCUMENTS
2006/0000778 A1* 1/2006 Childs et al. .................. 210/644
2007/0158020 A1* 7/2007 Tu et al. ..................... 156/272.6
* cited by examiner

*Primary Examiner* — Ramsey Zacharia
(74) *Attorney, Agent, or Firm* — WPAT, PC; Justin King

(57) ABSTRACT

The present invention discloses a method for forming a low biofouling filtration membrane. First, an ozone treatment is performed to a fluorine-based porous membrane to introduce peroxides on surface. Afterwards, a first grafting polymerization is initiated from the peroxides, and functional monomers are polymerized to introduce halide groups on surface. Finally, a second grafting polymerization is initiated from the halide groups, and macro-monomers are polymerized to introduce zwitterionic group on surface, so as to form the low biofouling filtration membrane.

13 Claims, 11 Drawing Sheets

US 8,062,751 B2

LOW BIOFOULING FILTRATION MEMBRANES AND THEIR FORMING METHOD

BACKGROUND OF THE INVENTION

1. Field of the Invention

The present invention is generally related to low biofouling filtration membranes, and more particularly to graft branched polymers or copolymers containing zwitterionic groups on fluorine-based filtration membranes or films for the purpose of anti-biofouling.

2. Description of the Prior Art

Proteinaceous biomolecules are highly complex, containing both hydrophilic and hydrophobic regions. These biomolecules are highly conformable and adaptable toward adsorption to surfaces having hydrophobic moieties thereat. Therefore, many hydrophilic surfaces are used to reduce protein adsorption. However, these surfaces are often not sufficient to prevent the undesirable adhesion of cells, bacteria, or other microorganisms. Even a small amount of proteins on a surface can lead to the adhesion and propagation of unwanted fouling. For example, fibrinogen adsorption less than 5-10 $ng/cm^2$ is needed to inhibit platelet adhesion for blood compatibility, and superlow fouling surfaces are required for these applications.

However, only a few candidates are regarded as "nonfouling materials" or "superlow fouling materials". Poly(ethylene glycol) (PEG) or oligo(ethylene glycol) (OEG) modified surfaces have been extensively studied to resist protein adsorption. The steric exclusion effect was considered as one of the reasons for PEG polymers to resist protein adsorption. However, PEG or OEG group decomposes in the presence of oxygen and transition metal ions found in most biochemically relevant solutions.

Phophorylcholine (PC)-based polymers or surfaces have been shown to decrease protein adsorption. They are considered as biomimetic fouling-resistant materials since they contain phosphorylcholine headgroups, which are found in the outside layer of cell membranes. The hydration of PC-based materials is also thought to be the reason for their resistance to protein adsorption. However, it is desirable to develop new materials other than PC for applications requiring long-term material stability due to the tendency of the phosphoester group to be hydrolyzed. In addition, PC monomers, such as 2-methacryloyloxyethyl phosphorylcholine (MPC), are moisture sensitive and not easy to synthesize and handle.

SUMMARY OF THE INVENTION

In accordance with the present invention, new method for forming low biofouling filtration membranes is provided that substantially overcomes the drawbacks of the above problems mentioned from the conventional system.

One object of the present invention is to use sulfobetaine polymers for surface modification of fluorine-based porous membranes. Similar to phosphorylcholine-based polymers, sulfobetaine polymers belong to polybetaine polymers, in which both cationic and anionic groups are on the same monomer residue. Compared with MPC, sulfobetaine methacrylate (SBMA) is easier to synthesize and handle.

Another object of the present invention is to control the highly polar sulfobetaine monomers grafting from the chemical inert, hydrophobic fluro-based polymers. The advantages of the present invention are obtained via, sequential ozone surface activation and surface-initiated polymerization of an appropriate functional monomer with halide groups, and sulfobetaine polymers are then grafted from the halide groups on surface through atom transfer radical polymerization (ATRP).

Still another object of the present invention is to apply the fluorine-based filtration membranes with grafted zwitterionic group in protein separation. The filtration experiments for bovine serum albumin (BSA) separation and two types of plasma protein (albumin and globulin) separation revealed that irreversible membrane fouling was remarkably reduced due to the incorporation of zwitterionic sulfobetaine group from SBMA polymer. The cyclic filtration tests for albumin yield an extremely low irreversible membrane fouling ratio ($R_{ir}$) of 13% in the first cycle and apparently no irreversible fouling is found in the second cycle. A more stringent test is carried by passing the γ-globulin solution. The virgin PVDF membrane is continuously fouled by γ-globulin after 3 cyclic operations, but the polySBMA modified membrane has a $R_{ir}$ value as low as 4.7% in the third cycle. Therefore, this present invention does have the economic advantages for industrial applications.

Accordingly, the present invention discloses a method for forming a low biofouling filtration membrane. First, an ozone treatment is performed to a fluorine-based porous membrane to introduce peroxides on surface. Afterwards, a first grafting polymerization is initiated from the peroxides, and functional monomers are polymerized to introduce halide groups on surface. Finally, a second grafting polymerization is initiated from the halide groups, and macro-monomers are polymerized to introduce zwitterionic group on surface, so as to form the low biofouling filtration membrane.

DESCRIPTION OF THE PREFERRED EMBODIMENTS

Figure 1:
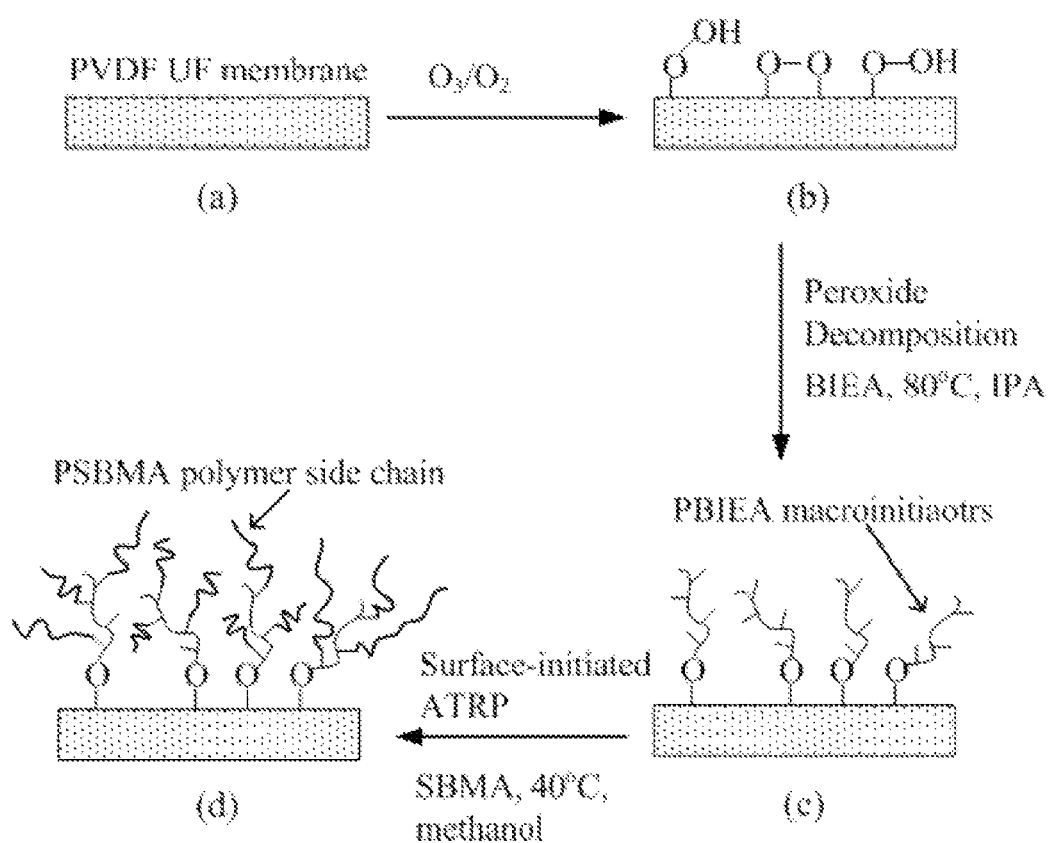
FIG. 1 is schematic illustration of the preparation process of the PVDF-g-PBIEA-g-PSBMA UF membranes via surface copolymerization—(a) a PVDF UF membrane cleaned via sonic in double distilled water at 25° C., (b) the PVDF UF membrane pretreated with a continuous stream of $O_3/O_2$ mixture in IPA at 25° C., (c) the ozone preactivated PVDF UF membrane incubated in a IPA solution containing PBIEA macroinitiator monomer at 80° C., (d) the PVDF-g-PBIEA membrane incubated in a methanol solution containing PSBMA macromonomer at 40° C.

What probed into the invention are low biofouling fluorine-based filtration membranes with grafted zwitterionic groups and their forming method. Detailed descriptions of the production and elements will be provided in the following in order to make the invention thoroughly understood. Obviously, the application of the invention is not confined to specific details familiar to those who are skilled in the art. On the other hand, the common procedures that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

Poly(vinylidene flureoride) (PVDF) is a widely used material for the prepared membranes in microfiltration (MF), ultrafiltration (UF) and nanofiltration (NF) with excellent chemical resistance, good thermal and mechanical properties. One of the most important requirements for PVDF membranes in biomedical applications is to reduce the nonspecific adsorption of biomolecules when living systems encounter hydrophobic membrane surfaces. In general, bio-fouling of membranes prepared from hydrophobic materials will lead to a change in biomolecular selectively decreasing the permeate flux with time, especially in the filtration of protein, platelet or cell-containing solutions. It is believed that the increase of hydrophilic moieties on a hydrophobic material surface can effectively reduce its membrane fouling as a consequence of the hydrophobic interactions between the biomolecules and hydrophobic surface. Therefore, an ideal anti-fouling membrane should possess the excellent mechanical bulk properties of a hydrophobic material, such as PVDF, and the anti-fouling characteristics of a hydrophilic surface on the membrane surface and pores.

In the first embodiment of the present invention, a low biofouling polymeric composite film is disclosed, the composite film is applicable in the following applications: separation of peptides and protein; purification of human blood without Virus or Leukoocytes; separation of microbial from waste water; preservation, purification, concentration or separation of stem cells. The polymeric composite film comprises an activated fluorine-based substrate (preferred activated by ozone treatment), and a layer of branched polymer containing zwitterionic functional groups formed on the fluorine-based substrate via surface grafting. Furthermore, in a preferred example of this embodiment, surface grafting is a two-step polymerization. In the first step, equal to or more than 5 mol % of halide containing monomers are used, such as: 2-(2-bromoisobutyryloxy) ethyl acrylate or 2-(2-choloisobutyryloxy) ethyl acrylate. The second step is Atom Transfer Radical Polymerization through the halide containing monomers, and in the second step, monomers containing zwitterionic functional groups are used to form a grafting polymer. The content of zwitterionic functional groups in the grafting polymer is equal to or more than 10 wt %. Additionally, the grafting density and chain length of polymer formed from the macro-monomers is at least 0.3 chains/nm² and 50 units, preferably above 0.5 chains/nm² and 100 units.

Moreover, the zwitterionic functional groups comprises one of the group consisting of: phosphobetaine, sufobetaine, carboxylbetaine, and their "derivatives". The tern "derivatives" means phosphobetaine, sufobetaine, or carboxylbetaine can be in the form of mixed charged compounds from equal molar ratio of positive and negative groups. Positively charged compounds can be Aminoethyl methacrylate hydrochlorides, 2-(Dimethylamino)ethyl methacrylate or 2-(Methacryloyloxy) ethyl trimethylammonium chloride. Negatively charged compounds can be 2-Carboxyethyl acrylate or 3-Sulfopropyl methacrylate.

In the second embodiment of the present invention, a method for forming a low biofouling polymeric composite film is disclosed. First, an ozone treatment is performed to a fluorine-based membrane to form a first intermediate, on whose surface peroxides (alkyl-peroxide and hydroxyl-peroxide) are formed as a result of reaction of the fluorine-based membrane surface with ozone. Afterwards, in the presence of a composition comprising at least one type of functional monomer, a first grafting polymerization is initiated from the peroxides of the first intermediate, wherein each functional monomer comprises at least one acrylic group and at lest one halide group (chloride or bromide is preferred), the acrylic group of the functional monomer reacts with the peroxide of the first intermediate, and the functional monomers polymerize with each other by their acrylic group, so as to form a second intermediate with halide groups on surface. Moreover, the preferred functional monomer is 2-(2-bromoisobutyryloxy) ethyl acrylate (BIEA). the temperature of the first grafting polymerization is higher than the peroxide decomposition temperature (higher than 70° C.).

Finally, in the presence of a composition comprising at least one type of macro-monomer, a second grafting polymerization is initiated from the halide groups of the second intermediate, wherein each macro-monomer comprises at least one acrylic group and at lest one zwitterionic group, the acrylic group of the macro-monomer reacts with the halide group of the second intermediate, and the macro-monomers polymerize with each other by their acrylic group, so as to form the low biofouling polymeric composite film with grafted zwitterionic group. Furthermore, the preferred macro-monomer is sulfobetaine acrylate or sulfobetaine alkylacrylate. Additionally, the grafting density and chain length of polymer formed from the macro-monomers is at least 0.3 chains/nm² and 50 units, preferably above 0.5 chains/nm² and 100 units.

In this embodiment, the preferred fluorine-based membrane is porous membrane, and can be classified into one of the three categories: micro-filtration membrane, ultra-filtration membrane, and nano-filtration membrane, and the material of the fluorine-based membrane comprises one of the group consisting of: polyvinylidene fluoride (PVDF), copolymers of tetrafluoroethylene and perfluoro(propyl vinyl ether), copolymers of tetrafluoroethylene and perfluoro-2,3-dimethyl-1,3-dioxole, copolymers of tetrafluoroethylene and vinyl fluoride, poly(vinyl fluoride), poly(vinylidene fluoride), polychlorotrifluorethylene, vinyl fluoride/vinylidene fluoride copolymers, and vinylidene fluoride/hexafluoroethylene copolymers.

In this embodiment, the surface of fluorine based polymer is activated by ozone treatment. The ozone concentration ranges from 5 to 50 $g/m^3$, and the duration of ozone treatment ranges from 5 to 60 minutes. Moreover, both the first grafting polymerization and the second grafting polymerization are controlled/living free radical polymerization, and Atom Transfer Radical Polymerization (ATRP) is preferred.

EXAMPLE

Poly(vinylidene fluoride) UF Membranes with Grafted Zwitterionic Sulfobetaine for Bovine Serum Albumin (BSA) Separation and Plasma Protein (albumin and globulin) Separation 1. Materials and Methods
A. Materials
[2-(Methacryloyloxy) ethyl]dimethyl(3-sulfopropyl)-ammonium hydroxide (sulfobetaine methacrylate, SBMA) macromonomer was purchased from Monomer-Polymer & Dajac Laboratories, Inc. Copper(I) bromide (99.999%), 2-bromoisobutyryl bromide (BIBB, 98%), pyridine (98%), 2-Hydroxyethyl acrylate (97%), 2,2"-bipyridine(BPY, 99%), and triethylamine(99%) were purchased from Sigma-Aldrich. Isopropyl alcohol (IPA, 99%) was obtained from Sigma-Aldrich and was used as a solvent for the ozone treatment and graft copolymerization. NVN-Dimethylacetamide (DMAc, 98%) for preparing the membrane casting solution was obtained from Sigma-Aldrich. 2-(2-bromoisobutyryloxy) ethyl acrylate (BIEA) was synthesized through the reaction of BIBB and 2-Hydroxyethyl acrylate using a method published previously.[34] Phosphate buffer saline (PBS) was purchased from Sigma.

B. Surface Copolymerization.
The PVDF UF membranes were prepared by the wet phase inversion from a DMAc solution containing 15 wt % PVDF powder with pore-forming agent poly(ethylene glycol) (PEG8000, PVDF/PEG weight ratio=4:1). The casting solutions were stirred for 24 h at 60° C. and were left 6 h to allow complete release of bubbles. After casting the solutions with a casting knife of 300 μm on a glass plate, the plate was immediately immersed in a coagulation bath of double distilled water. The UF membrane was formed via phase inversion at 25° C. It was then left overnight in a vacuum oven to allow complete release of residual solvent. A schematic illustration is shown in FIG. 1. The prepared PVDF UF membrane of about 40 $cm^2$ in surface area was pretreated with a continuous stream of $O_3/O_2$ mixture. The $O_3/O_2$ mixture was bubbled through 80 mL isopropanol (IPA) solution with a flow rate of 6 L/min for 30 min and ozone concentration of about 46 g/L at 25° C. which was generated from a custom-built ozone generator (Model OG-10PWA, Ray-E Creative Co., Ltd Taiwan). After the ozone treatment, the reactor flask was cooled quickly in an ice box at 4° C., purged by argon for 10 min, and keep in IPA before reaction. Then, the ozone-treated PVDF membrane was placed into a 30 mL IPA with 10 wt % BIEA monomer. The reactor flask with solution was saturated with purified argon for 5 min and then placed in an oil bath at 80° C. under constant stirring. After the reaction for 24 h, the PBIEA grafted PVDF membrane (PVDF-g-PBIEA) was transferred into purified IPA. Unreacted monomers and homopolymers were extracted with double distilled water and acetone in an ultrasonic washer and the residue solvent was removed in a vacuum oven under reduced pressure.

The surface copolymerization of SBMA macromonomer on the PVDF-g-PBIEA membrane was prepared via surface-initiated ATRP. A schematic illustration is also shown in FIG. 1. The PVDF-g-PBIEA membrane of about 40 $cm^2$ in surface area was placed into a 30 mL methanol solution with SBMA macromonomer content adjusted from 0.56 to 5.6 g to achieve the desired grafting density of polySBMA. A purified argon stream was introduced to degas the solution in a single-necked round-bottom flask for about 20 min. 316 mg 2,2'-bipyridine and 100 mg CuBr were added sequentially to the solution. The reactor flask with solution was purged with purified argon for 5 min and then placed in an oil bath at 40° C. under constant stirring. After the reaction for 24 h, the polySBMA grafted PVDF-g-PBIEA membrane (PVDF-g-polySBMA) was transferred into purified methanol and was then extracted with double distilled water and methanol. The residue solvent was removed in a vacuum oven under reduced pressure. In this study, all membranes on the surface modification were performed under the same experimental conditions.

C. Surface Characterization
The chemical composition of surface-modified PVDF membranes with PBIEA and polySBMA was characterized using FT-IR spectrophotometer (Perkin-Elmer Spectrum One) and using Zinc Selenide (ZnSe) as an internal reflection element. Each spectrum was captured by averaged 32 scans at a resolution of 4 $cm^{-1}$. The surface composition of the membranes was also characterized by X-Ray photoelectron spectroscopy (XPS). XPS analysis was performed using a PHI Quantera SXM/Auger spectrometer with a monochromated Al KR X-ray source (1486.6 eV photons). The energy of emitted electrons is measured with a hemispherical energy analyzer at pass energies ranging from 50 to 150 eV. All data were collected at the photoelectron takeoff angles of 45° with respect to the sample surface. The binding energy (BE) scale is referenced by setting the peak maximum in the C 1s spectrum to 284.6 eV. High-resolution C 1s spectrum was fitted using a Shirley background subtraction and a series of Gaussian peaks. Data analysis software was from Service Physics, Inc. The grafting density of polySBMA on the PVDF membrane was determined by the extent of weight increase compared with the virgin PVDF membrane and normalized to the outer surface area of the membranes. Prior to the weight measurements, the membranes were dried overnight in a vacuum oven at 50° C. Weight measurements were performed using three independent membranes for each modified membrane, and the average value was reported. Water contact angles were measured with an angle-meter (Automatic Contact Angle Meter, Model CA-VP, Kyowa Interface Science Co., Ltd Japan) at 25° C. The DI water was dropped on the sample surface at ten different sites. The average of the measured values from three independent membranes for each modified membrane was taken as its water contact angle. The surface morphology of the surface-modified PVDF UF membranes was observed under JEOL JSM-5410 scanning electron microscopy (SEM) operating at an accelerating voltage of 7 keV. The membranes were mounted on the sample stages by means of double-sided adhesive tape and were sputter-coated with gold prior to SEM.

D. Protein Adsorption on the Membranes

The adsorption of BSA and γ-globulin (99%, purchased from Sigma-Aldrich) onto the prepared PVDF UF membranes was evaluated using the method of Bradford according to the standard protocol of the Bio-Rad protein assay. The membrane with 20 cm² of surface area was rinsed with 20 mL of ethanol for 30 min and transferred into a clean test tube, followed by the addition of 20 mL of PBS solution for 30 min. Then, the membrane was soaked in 5 mL of 1 mg/mL BSA and γ-globulin in 0.1 M PBS solution (PH 7.4) for 24 h at 37° C. respectively. The membrane was then followed by the addition of dye reagent containing Coomassie Brilliant Blue G-250 and was incubated for 5 min. The absorbance at 595 nm was determined by a UV-VIS spectrophotometer.

E. Ultrafiltration Experiments

A dead-end cell filtration system connected with a nitrogen gas cylinder and solution reservoir was designed to characterize the filtration performance of the prepared membranes. The system consisted of a filtration cell (HP4750 stirred cells, Sterlitech Corp.) with a volume capacity of 300 mL and an inner diameter of 49 mm. Before the filtration experiments, the virgin or prepared membranes were incubated and pressurized with double distilled water for 30 min at 1.5 atm. All the ultrafiltration experiments were operated at a pressure of 1.0 atm, a temperature of 25° C. and a stirring speed of 300 rpm. The $i^{th}$ cycle permeation flux ($J_{w,i}$ or $J_{P,i}$) was checked from time to time until steady and calculated by the following equation:

$$J_{w,i} = \frac{V_{w,i}}{A \Delta t} \text{ or } J_{P,i} = \frac{V_{P,i}}{A \Delta t} \tag{1}$$

where the parameters: $V_{w,i}$, $V_{P,i}$, A, and $\Delta t$ denote the pure water and protein solution permeate volume in the $i^{th}$ cycle (in L), membrane area (in m²) and permeation time (in h). For each cyclic operation, the filtration cell was emptied and refilled with 1 mg/mL protein solution, and the flux was checked from time to time until a steady flux was obtained. The protein rejection ratio (R) was then calculated by the following equation:

$$R(\%) = \left(1 - \frac{C_P}{C_f}\right) \times 100\% \tag{2}$$

where parameters of $C_p$ and $C_f$ are protein concentration of permeate and feed solution respectively. The protein concentration was measured by a UV-VIS Spectroscopy (JASCO V-550, Japan). The used membranes were then cleaned by flushing deionized water. To complete a cycle, pure water flux was again measured. The degree of water flux recovery during the $i^{th}$ cycle, $FR_{w,i}$, can be calculated by the following equation:

$$FR_{w,i}(\%) = \left(\frac{J_{w,i}}{J_{w,i-1}}\right) \times 100\% \tag{3}$$

To evaluate the fouling-resistance of a membrane, the degree of flux loss caused by total protein fouling in the $i^{th}$ cycle, $R_{t,i}$, was defined as $$R_{t,i}(\%) = \left(\frac{J_{w,i} - J_{P,i}}{J_{w,i}}\right) \times 100\%. \tag{4}$$

The flux loss was caused by both reversible and irreversible protein fouling in the $i^{th}$ cycle ($R_{r,i}$ and $R_{ir,i}$). Each of them was defined by $$R_{r,i}(\%) = \left(\frac{J_{w,i} - J_{P,i}}{J_{w,i-1}}\right) \times 100\% \tag{5}$$

$$R_{ir,i}(\%) = \left(\frac{J_{w,i-1} - J_{w,i}}{J_{w,i-1}}\right) \times 100\% = 100\% - FR_{w,i} \tag{6}$$

2. Results and Discussion

A. Surface Grafting and Characterization

The PVDF ultra-filtration membrane was prepared by the wet inversion process. Polyethylene glycol was added in the PVDF casting solution as the pore former. Brush like polySBMA polymer was grafted to resist protein fouling during ultra-filtration. In order to graft the highly polar SBMA onto the hydrophobic surface of PVDF membrane, ozone was used to activate the PVDF and brush like structure was created by surface-initiated ATRP of SBMA.

As shown in FIG. 1, the process for surface modification could be divided into three stages. The first stage was to produce peroxides on the PVDF membrane via ozone treatment. The amount of produced peroxide was controlled by the $O_3$ concentration and the treating time. The peroxide content on PVDF was determined by 2,2-diphenyl-1-picrylhydrazyl (DPPH) depletion assay. It was found that thirty minutes ozone treatment generated a peroxide content of 2.35 nmol/cm².

Figure 2:
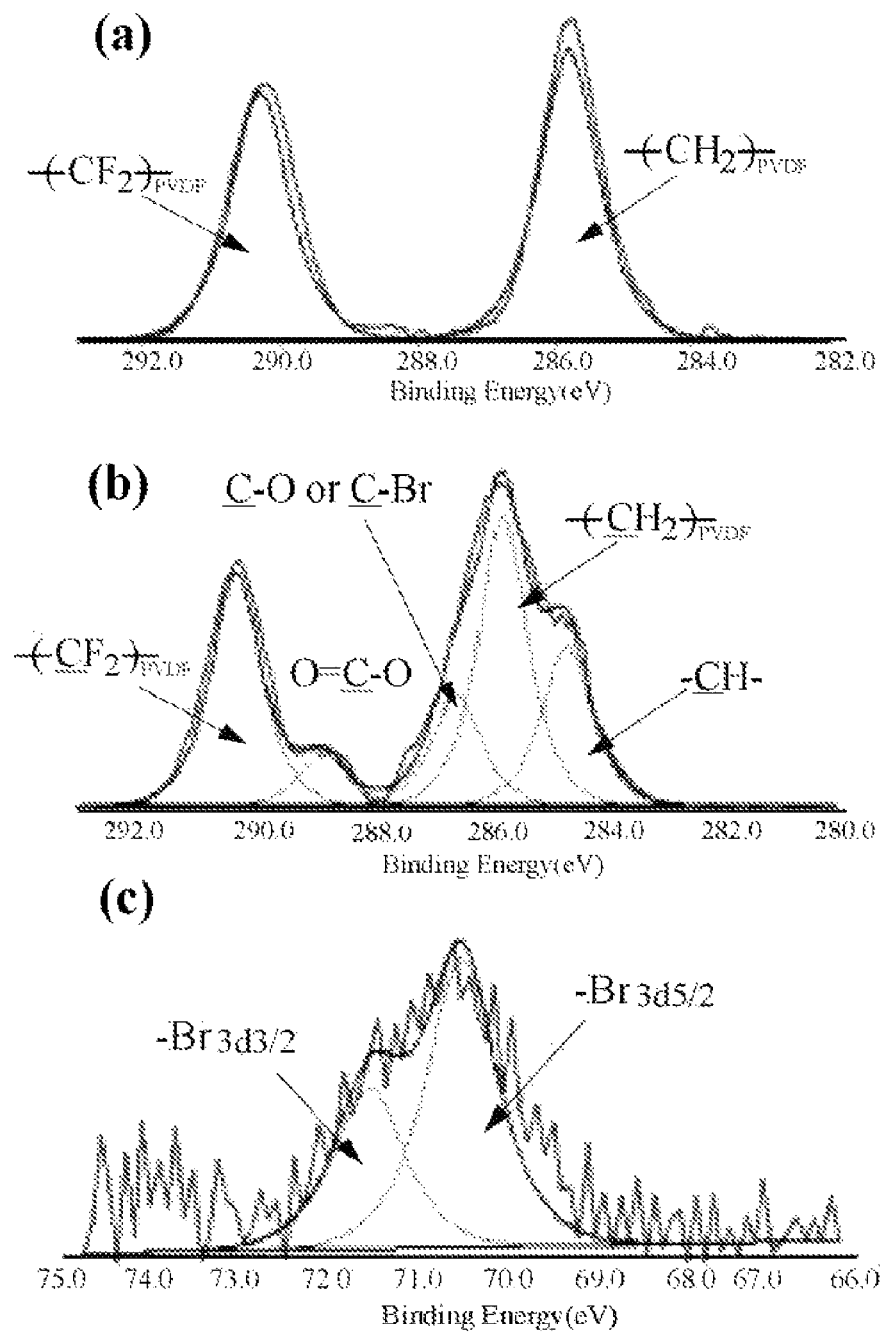
FIG. 2 is XPS $C_{1S}$ core-level spectra of (a) the virgin PVDF UF membrane, and (b) the PVDF-g-PBIEA UF membrane; High resolution XPS spectra of $Br_{3d}$ region of (c) the PVDF-g-PBIEA UF membrane.

The second stage was to graft the initiator, BIEA, onto the surface of PVDF membrane via thermal-induced polymerization. In this stage, the decomposition of peroxides on ozone-treated PVDF membranes was executed by raising the temperature. Considering the long half-life of peroxide decomposition, a BIEA grafting time of 24 hours at 80° C. was used in this study. The grafted BIEA is identified by XPS measurement. FIG. 2(b)-(c) shows the XPS $C_{1s}$ and $Br_{3d}$ core-level spectra of the PVDF-g-PBIEA membrane. The $C_{1s}$ core-level spectra possessed five components via curve fitting. Two of them had the binding energies of —$CH_2$— (285.9 eV) and —$CF_2$— (290.4 eV) which are associated with the chemical structure of PVDF as that shown in FIG. 2(a). The other three peaks with binding energy of —CH— (284.6 eV), C—O or C—Br (286.5 eV) and O=C—O (288.8 eV) which are associated with the grafted PBIEA chains. The $Br_{3d}$ core-level spectra provided a direct evidence of covalently bonded bromide in PBIEA chains. The appearance of $Br_{3d5/2}$ peak at 70.5 eV further indicated that the macro-initiator, BIEA, were successfully grafted the membrane surface.

Figure 3:
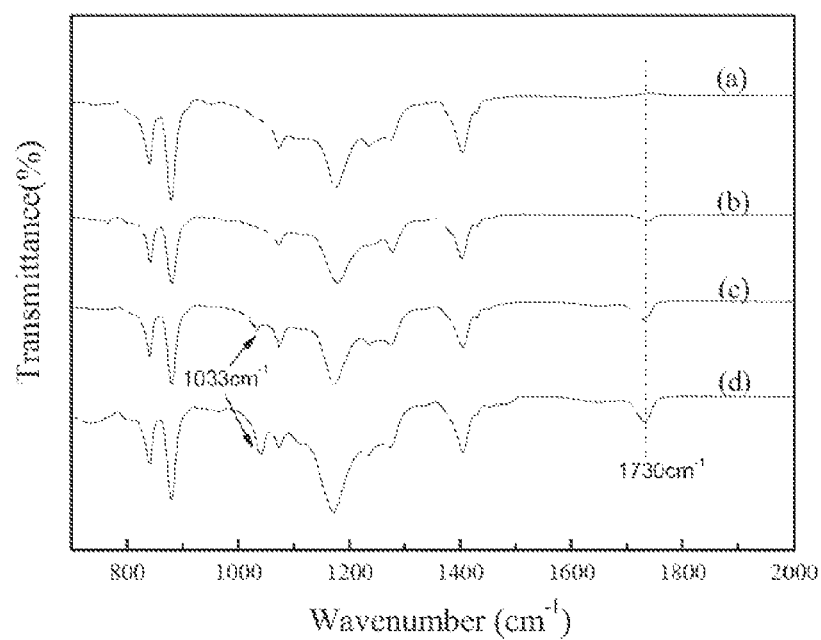
FIG. 3 is FT-IR spectra of (a) the virgin PVDF, (b) the PVDF-g-PBIEA, and the PVDF-g-polySBMA membranes with polySBMA grafting density of (c) 0.18 $mg/cm^2$ and (d) 0.4 $mg/cm^2$.

The third stage in the preparation process was to copolymerize the macro-monomer of SBMA to the PVDF-g-PBIEA membranes via ATRP. The grafted amount of SBMA was controlled by the ratio of SBMA to BIEA in the reaction solution and also by the reaction time of ATRP. Atom transfer radical polymerization was activated by the bromide in BIEA under the catalysis of Cu(I)/bpy. FT-IR measurement was used to characterize the chemical composition of the polySBMA modified PVDF membrane and its typical spectrum was shown in FIG. 3. For the grafted PSBMA polymer, the presence of the grafted polymer could be ascertained from the ester carbonyl groups and the sulfonate groups observed from the bands of O—C=O stretch at 1727 cm⁻¹ and —$SO_3$ stretch at 1033 cm⁻¹, respectively. The intensity of the O—C=O adsorption at 1727 cm⁻¹ and —$SO_3$ at 1033 cm⁻¹ increased obviously as the starting SBMA concentration was increased from 0.019 to 0.187 g/mL.

Figure 4:
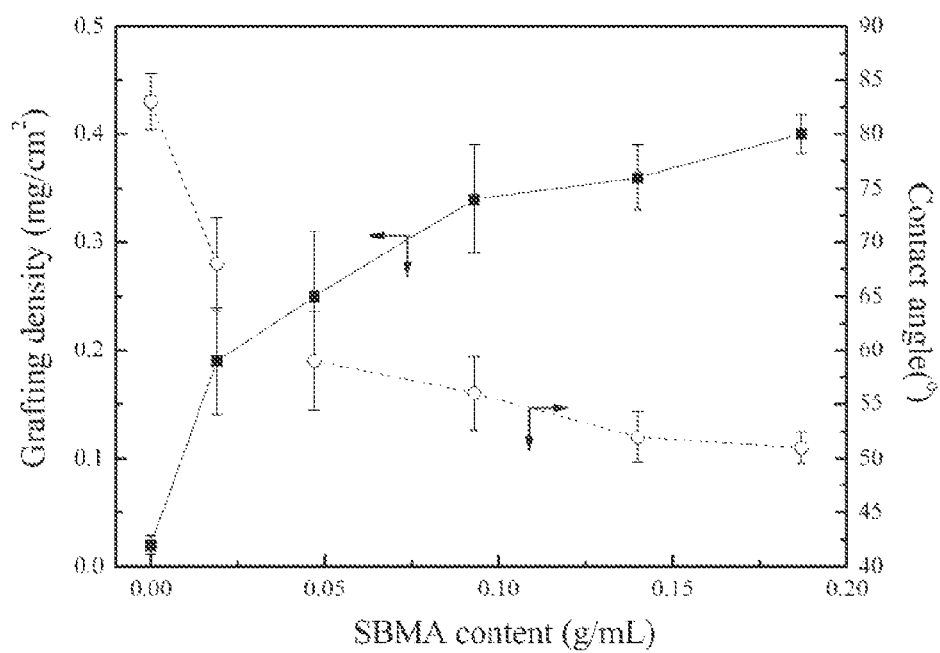
FIG. 4 shows effect of SBMA content in the reaction solution on the surface grafting density and water contact angle of the prepared PVDF UF membranes.

The grafting density was measured by the weight increase of modified membranes. FIG. 4 showed the dependence of surface grafting density and contact angle on the monomer concentration in the reaction solution. As the SBMA concentration increased, the grafting density of the copolymerized polySBMA on the PVDF membrane increased, and the water contact angle decreased. The grafting density seemed to increase monotonically with the increase of SMBA concentration and finally reached the highest value of 0.4 mg/cm$^2$. Similarly, the water contact angle decreased smoothly with the increase of SBMA and reached a lowest value of 52°. Both curves of the PVDF-g-PBIEA-g-PSBMA membrane approached to their optimum values while the SBMA concentration was higher than 0.187 g/mL.

B. Surface Morphology of the Prepared PVDF Membranes

Figure 5:
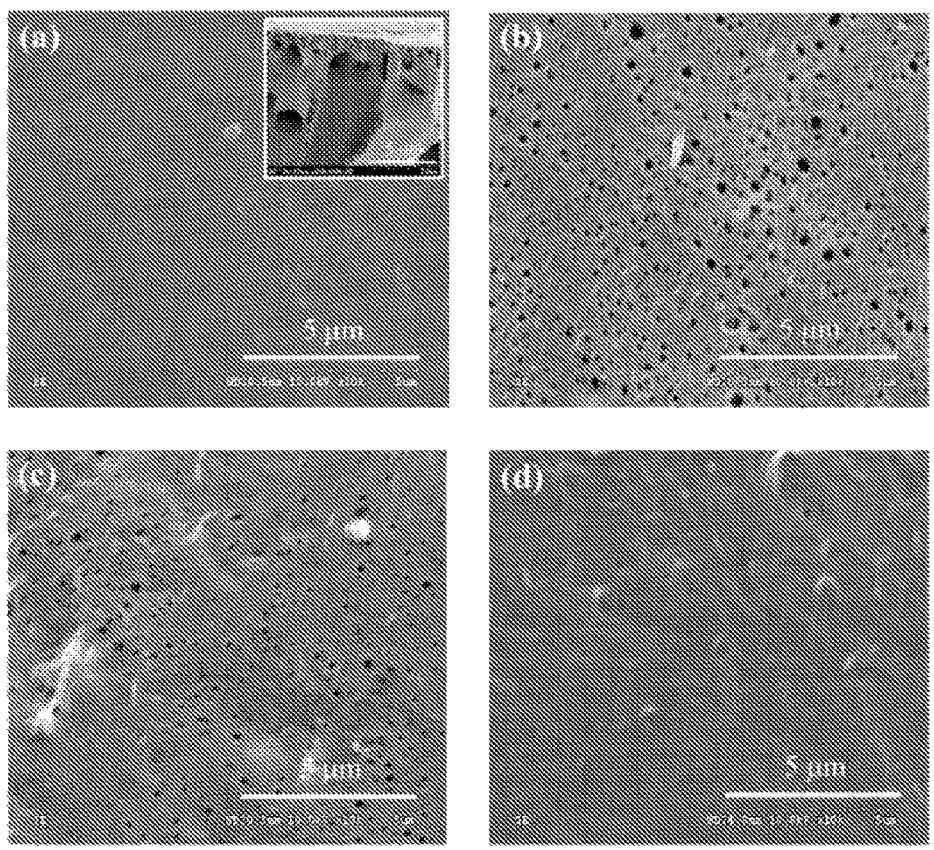
FIG. 5 are SEM photographs of surface morphology of the prepared PVDF UF membranes with polySBMA grafting amount of (a) 0.0 $mg/cm^2$ prepared by the wet phase-inversion process, (b) 0.0 $mg/cm^2$ with ozone pretreatment for 30 min at 25° C., (c) 0.18 $mg/cm^2$, and (d) 0.4 $mg/cm^2$. All images with magnification of 10000×.

The surface morphology of the modified membranes was observed by SEM at a magnification of 10000×. FIG. 5(a) is a SEM image of the virgin PVDF membrane. The finger-like macrovoids with a top skin layer was observed from the cross-section morphology in the inset in FIG. 5(a). After the ozone treatment, larger pores were observed on the surface, shown in FIG. 5(b), which was probably caused by ozone etching. FIG. 5(c)-(d) showed the SEM images of the PVDF membrane grafted with PSBMA of different grafting densities. It could be observed that the membrane with a PSBMA grafting density of 0.19±0.05 mg/cm$^2$ was only partially covered with grafted PSBMA polymer. As the grafting density of PSBMA was increased to 0.4±0.018 mg/cm$^2$, the pores on membrane surface were fully covered. According to the SEM images, it seemed that the steady decrease of water contact angle along with the increase in grafting density was due to the increase in surface coverage of PSBMA instead of the increase in the thickness of the PSBMA layer.

C. Protein Adsorption

Figure 6:
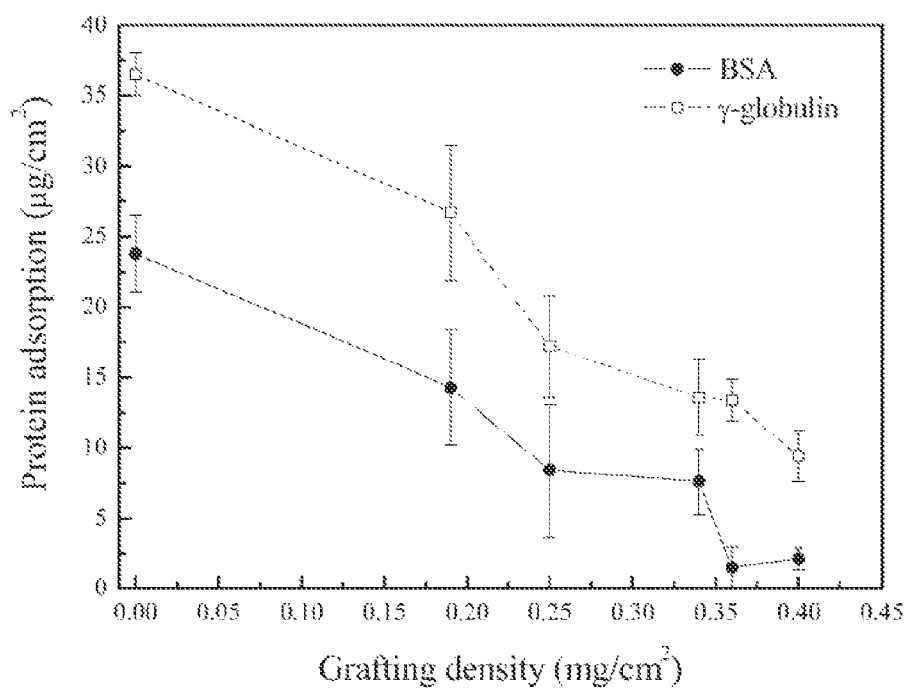
FIG. 6 shows BSA and γ-globulin adsorption amount on the surface of the prepared PVDF UF membranes as a function of polySBMA grafting density. All membranes were incubated in 5 mL of 1.0 mg/mL protein in PBS solution for 24 h at 37° C.

The measurement of protein adsorption has already become a good indication of the filtration performance of membrane for protein processing. Two major plasma proteins, albumin and γ-globulin were selected to test in this study. The protein adsorption was evaluated by immersing the membranes in 1 mg/mL BSA or γ-globulin solution and the amount of adsorbed protein was estimated by measuring the protein concentration in the supernatant. FIG. 6 showed the effect of grafting density on the amount of BSA or γ-globulin adsorption. All of the adsorption data were normalized to the apparent surface area of the measured membranes. It was found that both the adsorptions of BSA and γ-globulin decreased linearly with the grafting density and the slopes were almost identical. It was due to the different surface coverage of SBMA on PVDF and the different affinities of BSA and γ-globulin toward the pristine PVDF surface. The adsorption density of γ-globulin was 10 μg/cm$^2$ and that of BSA could get down to as low as 1 μg/cm$^2$. It should be noted that the actual adsorption density should be much lower than the above reported data since the membrane has porous structure and the actual adsorption surface area was much larger than the apparent surface. The results have demonstrated that the chemical inert surface of PVDF could be successfully grafted with zwiiterionic sulfobetaine and the protein adsorption on the membrane surface was greatly reduced.

D. Cyclic Filtration of BSA Solution

Figure 7:
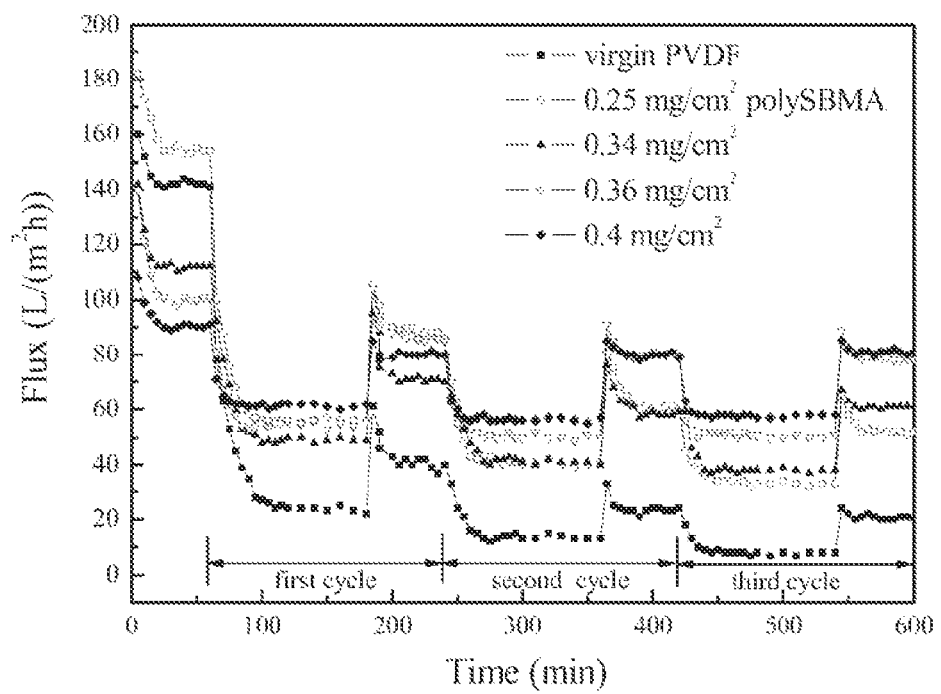
FIG. 7 shows time-dependent flux of the PVDF UF membranes grafted with different amounts of polySBMA. Ultrafiltration process was operated at a pressure of 1.0 atm, a temperature of 25° C. and a stirring speed of 300 rpm. The BSA concentration is 1.0 mg/mL in PBS solution.
Figure 8:
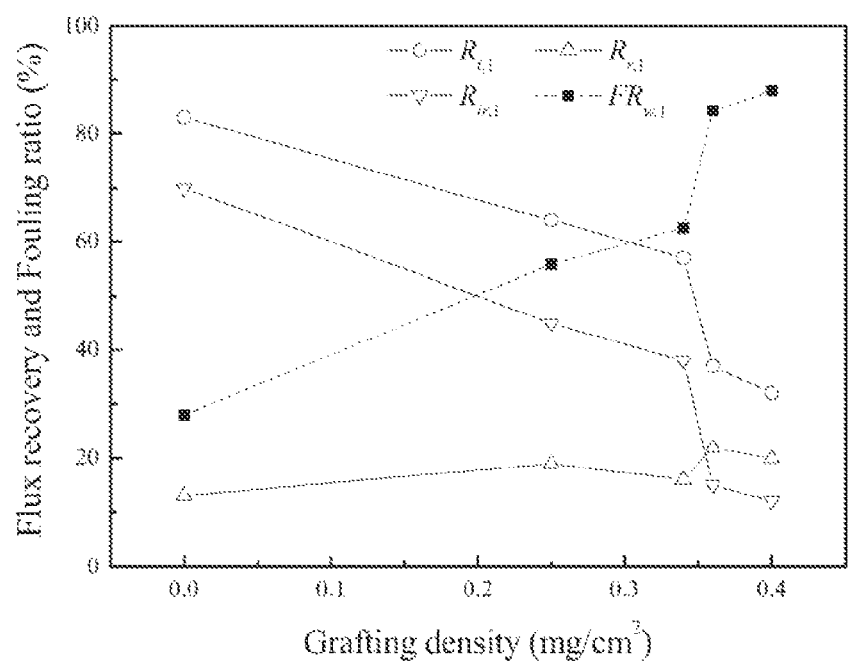
FIG. 8 shows effect of polySBMA grafting density on flux recovery ratio ($FR_{w,1}$) and fouling ratio (R: $R_{t,1}$, $R_{ir,1}$ and $R_{r,1}$) in the first cycle of the filtration test using BSA as the tested protein.

The biofouling characteristics of the polySBMA grafted PVDF membrane was evaluated by cyclic filtration tests. To begin the test, pure water was first passed through the membrane and a steady flux, designated as $J_{w0}$, was obtained. FIG. 7 shows the flux of PVDF membranes grafted with polySBMA of different grafting densities. It was found that the $J_{w0}$ of the membrane grafted with 0.25 mg/cm$^2$ polySBMA was actually higher than that of the virgin PVDF membrane. The higher flux was probably due to the etching caused by ozone treatment. It was also found that the $J_{w0}$ values decreased as the amount of grafted polySBMA was further increased. Each filtration cycle could be divided into three phases. The first phase was the filtration of protein solution. The second phase was simple membrane cleaning by pure water flushing. And the third phase was the passing of pure water. As shown in FIG. 7, the permeation flux of BSA solution decreased rapidly at the initial stage because of protein fouling. A steady flux ($J_{Pi}$) was obtained when the protein adsorption became saturated. To monitor the irreversible membrane fouling, the pure water flux ($J_{wi}$) was measured after membrane cleaning. The values of $J_{wi}$ and $J_{Pi}$ could then be used to calculate water flux recovery, total fouling, reversible and irreversible fouling ratios. FIG. 8 shows these ratios in the first cycle using BSA as the tested protein. The total protein fouling ($R_{t,i}$) was calculated by equation (4) which represented the percentage flux loss because of protein adsorption and retention. The total protein fouling was actually built up by persistent protein adsorption and temporal protein blockage. The flux loss because of temporal protein blockage was reversible and could be recovered by membrane cleaning. Therefore, the reversible fouling ratio, $R_{r,i}$, was defined by the percentage of pure water flux recovered in the third phase from its loss in the first phase. The percentage of unrecoverable flux, which was resulted from the fouling of persistent protein adsorption, was defined as the irreversible fouling ratio, $R_{ir,i}$. The water flux recovery ratio, $FR_{w,i}$, defined as the ratio of pure water flux in the i$^{th}$ cycle to that in the previous cycle, was exactly equal to $1-R_{ir,i}$. The antifouling capability of a membrane was usually monitored by the value of $R_{ir,i}$ or $FR_{w,i}$. The higher value of $FR_{w,i}$ indicated the lower persistent protein adsorption to the membrane operated during the i$^{th}$ cycle. The first cycle analysis was shown in FIG. 8. The value of $FR_{w,1}$ was only 28.3% for the untreated PVDF membrane, but it increased as the grafting density increased. The value had a sudden increase at the grafting density of 0.35 mg/cm$^2$ and further increased to 88.8% at the grafting density of 0.4 mg/cm$^2$. The first cycle analysis of BSA filtration indicated that the PVDF membranes grafted with polySBMA effectively reduced the membrane fouling. By the adopted grafting method, the surface of PVDF could be fully covered only when the grafting density was increased to above 0.35 mg/cm$^2$. To further analyze the membrane fouling, we need to discuss the values $R_{t,1}$, and $R_{r,1}$. The $R_{t,1}$ value represented the overall effect of fouling on flux loss. The loss may be contributed by both the loosely attached and the firmly adsorbed proteins. It was observed that the $R_{t,1}$ decreased with the increase in polySBMA grafting density and there was a sudden drop of $R_{t,1}$ at the grafting density of 0.35 mg/cm$^2$. The $R_{r,1}$ value was contributed by the loosely attached proteins. The result showed that the $R_{r,1}$ remained almost constant as the grafting density increased from 0 to 0.35 mg/cm$^2$ and dropped to almost 0% at the grafting density of 0.4 mg/cm$^2$. The above results indicated that the 0.35 mg/cm$^2$ PSBMA grafting was sufficient to reduce the irreversible membrane fouling and it needed a density of 0.4 mg/cm$^2$ to eliminate the reversible fouling. The remaining irreversible fouling was probably due to the trapping of BSA in the pores of similar size. It was also suspected that the grafting up to 0.35 mg/cm$^2$ was still not enough to fully cover the walls of most pores. BSA loosely attached to the limited hydrophobic area. As the grafting density was increased to above 0.40 mg/cm$^2$, the pore surface was fully covered by polySBMA and the reversible fouling was fully eliminated.

E. Cyclic Filtration of γ-globulin Solution

Figure 9:
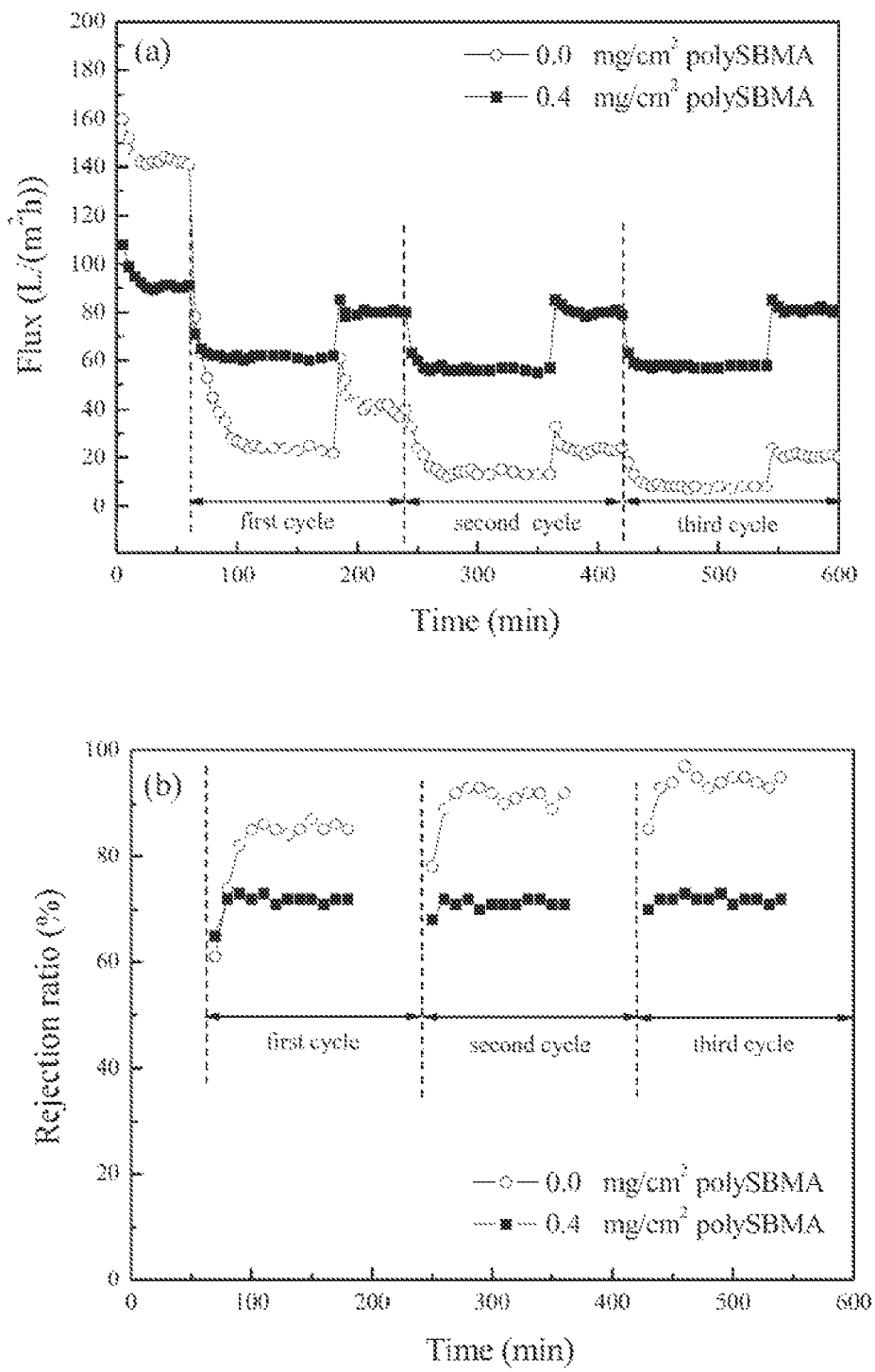
FIG. 9 shows time-dependent of (a) recycling flux and (b) rejection ratio for the virgin PVDF UF membrane and PVDF-g-polySBMA membrane grafted with 4.0 mg/cm² PSBMA polymers, respectively. All process was operated with three cycles of BSA solution ultrafiltration in the room temperature.

To further evaluate the filtration performance of the PVDF membrane fully covered by polySBMA, we extended our discussion to the second and third filtration cycles and tested the membranes with both BSA and γ-globulin solutions. The low BSA filtration of the membrane grafted with 0.40 mg/cm$^2$ polySBMA was shown in FIG. 9. It was found that the fluxes of protein solution in the three cycles were almost identical. And the rejection of BSA was held steady after the first cycle. On the contrary, the flux of protein solution through the virgin PVDF membrane in the third cycle was obviously lower than that in the second cycle. The BSA rejection of the virgin PVDF membrane was also increased after each cyclic operation. These results showed the excellence performance of the PVDF-g-polySBMA membranes for BSA filtration. It should also be noted that the rejection of BSA of the PVDF-g-polySBMA membrane was only 72%. It meant that there were BSA molecules continuously passing through the pores of the membrane but they did not cause further membrane fouling. This phenomenon suggested that the grafting of polySBMA did in fact penetrate into the pores so that the fouling was limited in the first cycle.

Figure 10:
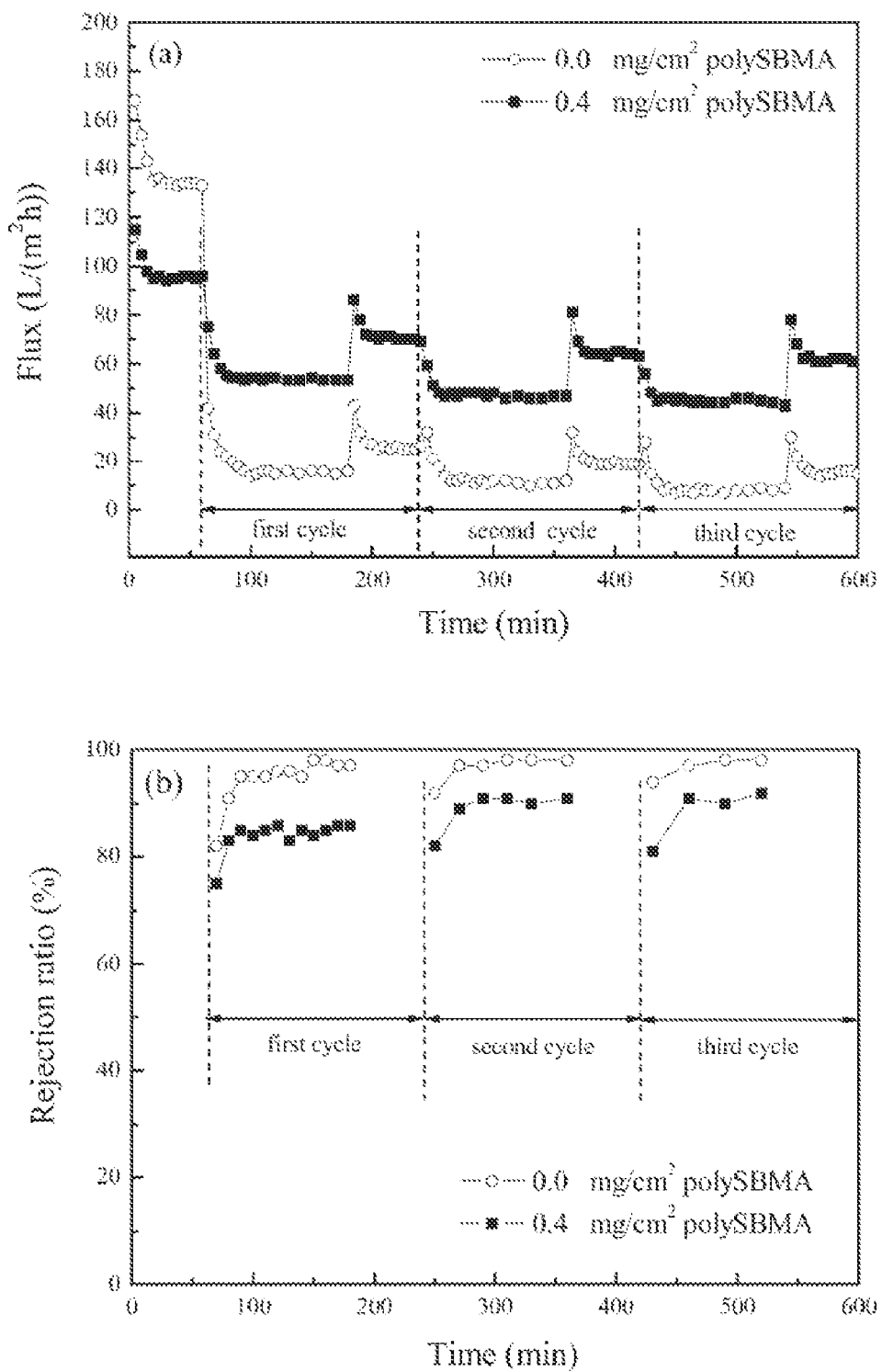
FIG. 10 shows Time-dependent of (a) recycling flux and (b) rejection ratio for the virgin PVDF UF membrane and PVDF-g-polySBMA membrane grafted with 0.4 mg/cm² polySBMA, respectively. All process was operated with three cycles of γ-globulin solution ultrafiltration in the room temperature.
Figure 11:
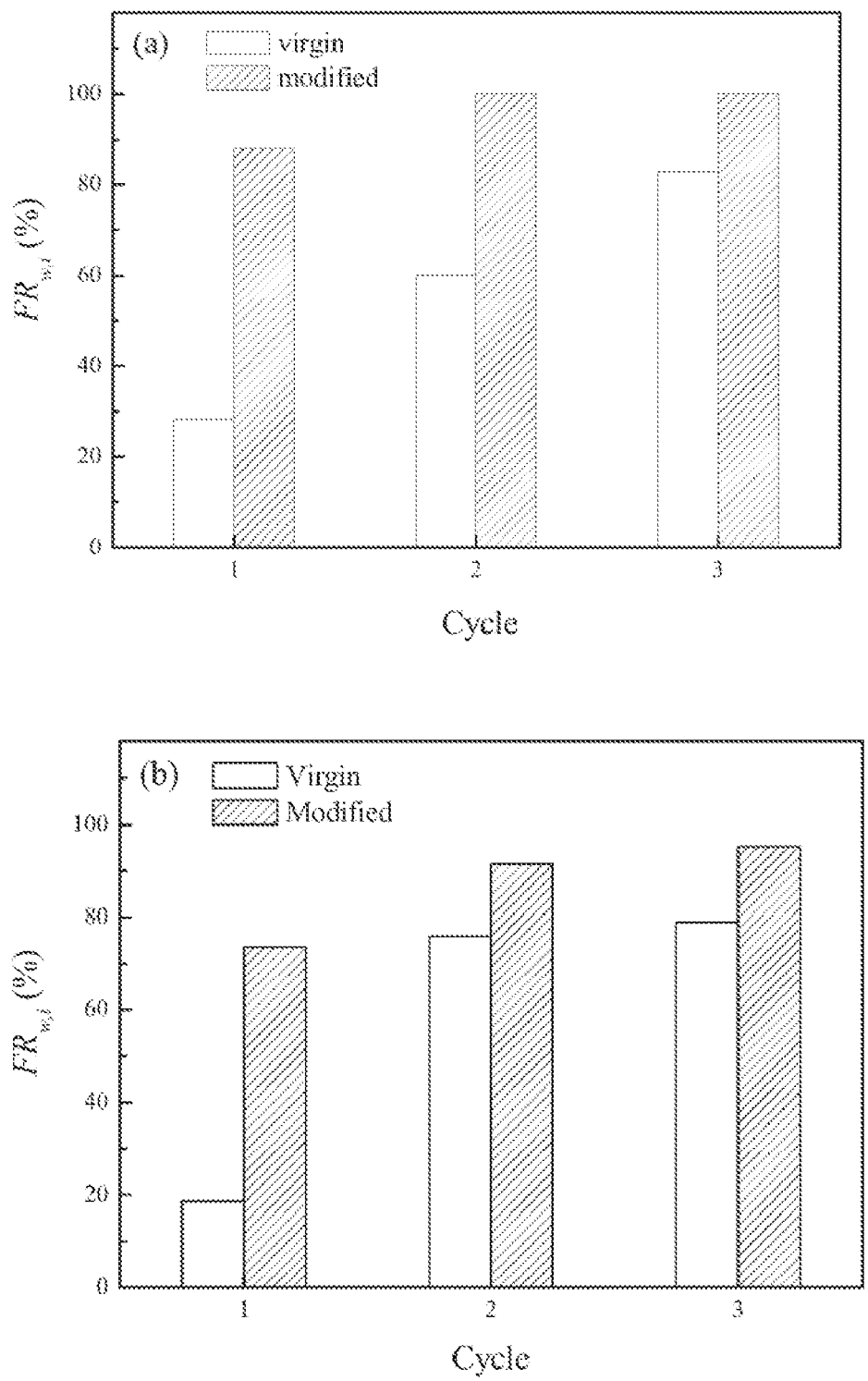
FIG. 11 shows the comparison of water flux recovery during the $i^{th}$ cycle between the virgin PVDF UF membrane and PVDF-g-polySBMA membrane grafted with 0.4 mg/cm² polySBMA for (a) BSA solution and (b) γ-globulin solution.

FIG. 10 shows the results of γ-globulin filtration through the PVDF-g-polySBMA membranes. Unlike the BSA filtration, the results of γ-globulin filtration showed that both the virgin and modified membranes were continuously fouled by γ-globulin. The permeation fluxes were decreased and the rejection ratio increased after each cyclic operation. In spite of its continuous fouling, the performance of the PVDF-g-polySBMA membrane was still much better than that of the virgin PVDF. FIG. 11 shows the water flux recovery ratio of these two membranes. For the virgin PVDF membrane, the water flux recovery ratio was 18.7% in the first cycle. The value was increased to 76% in the second cycle and reached 79% in the third cycle. In other words, the results indicated that the irreversible fouling was 81.3% in the first cycle, 24% in the second cycle, and 21% in the third cycle. The amount of newly formed irreversible adsorption of γ-globulin was still significant. For the PVDF-g-polySBMA membrane, the water flux recovery ratio was 74.7% in the first cycle. The value was increased to 91.4% in the second cycle and reached 95.3% in the third cycle. It reflected an irreversible fouling ratio of 25.3% in the first cycle, 8.6% and 4.7% in the second and third cycle. The modified membrane was still continuously fouled by γ-globulin. But the degree of irreversible fouling was significantly reduced after the first cycle. There may be two possible reasons for continuous fouling. One possibility is that the membrane rejection to γ-globulin was high. The amount of γ-globulin entering the pores was too small to saturate the adsorption sites. Another possibility is that some of the irreversibly adsorbed γ-globulin undergoes conformational change so that γ-globulin continuously adsorbed to the deformed proteins. We suspected that it is the first reason that causes continuous fouling. The second possibility should result in a strong adsorption of γ-globulin in the second cycle but near 100% water flux recovery in the third cycle. If the continuous fouling is caused by the first hypothesis, we can conclude that the polySBMA is also grafted onto the surface of the pores by the method of ozone surface activation and the following ATRP. Limited protein adsorption in the pores ensures its high water flux recovery in the second and third cycle.

In the above-mentioned example, PVDF UF membranes were successfully grafted with zwitterionic PSBMA polymer through ozone activated surface-treatment and surface-initiated atom transfer radical polymerization. The membrane grafted with 0.4 mg/cm$^2$ PSMA hardly adsorbs BSA but adsorbs a small amount of γ-globulin of 10 μg/cm$^2$. The cyclic filtration test of the membrane using BSA solution showed perfect non-fouling characteristics. The water flux recovery was 88.9% in the first cycle and reached 100% in the second cycle. The similar test on γ-globulin showed some but low protein fouling. The water flux recovery was 73.7% in the first cycle and reached 95.5% in the third cycle. The results indicated that the protein fouling could be effectively stopped by sufficient PSBMA grafting. The low-fouling characteristics suggested that the PSMBA grafting by the suggested method, ozone surface activation followed by surface-initiated atom transfer radical polymerization, could actually penetrate into the pores. In addition, the cyclic filtration test of BSA alone might not be sufficient to demonstrate the protein fouling to the membranes, in stead, the test on γ-globulin gave a closer look.

In addition to protein separation, the low biofouling filtration membrane provided in this invention can be used in membrane bioreactor. Membrane bioreactor (MBR), usually is a combination of conventional wastewater treatment and a membrane filtration process, has acquired considerable attention in the development of alternative water resources as a result of the following advantages: complete solids removal, significant physical disinfection capability, superior organic and nutrient removals and small footprint. However, membrane fouling in the MBR, which increases the operational cost, limits their usage. Membrane fouling is a ubiquitous phenomenon in MBRs, which is mainly caused by microbial substances. In a MBR process containing a variety of bacteria, the bacterial adhesion to the membrane surface, prior to cake formation, causes an increased filtration resistance. Therefore, the above-mentioned fluorine-based filtration membranes with grafted zwitterionic group can remarkably reduce the bacterial adhesion, so as to obtain higher filtrate. Furthermore, the low biofouling filtration membrane provided in this invention can also be used in the purification, concentration or separation of stem cells.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A low biofouling polymeric composite membrane, comprising:
    an activated fluorine-based substrate;
    a layer of branched polymer containing zwitterionic functional groups formed on the fluorine-based substrate via surface grafting;
    wherein the grafting density of the grafting polymer is equal to or more than 0.3 chains/nm$^2$, the chain length of the grafting polymer is equal to or more than 50 units, and the zwitterionic functional groups are derived from one compound selected from the group consisting of the following: phosphobetaine, sulfobetaine, carboxylbetaine, and their derivatives.

2. The composite membrane according to claim 1, wherein the fluorine-based substrate comprises one of the group consisting of: polyvinylidene fluoride (PVDF), copolymers of tetrafluoroethylene and perfluoro(propyl vinyl ether), Copolymers of tetrafluoroethylene and perfluoro-2,3-dimethyl-1,3-dioxole, copolymers of tetrafluoroethylene and vinyl fluoride, poly(vinyl fluoride), poly(vinylidene fluoride), polychlorotrifluorethylene, vinyl fluoride/vinylidene fluoride copolymers, and vinylidene fluoride/hexafluoroethylene copolymers.

3. The composite membrane according to claim 1, wherein the fluorine-based substrate is activated by ozone treatment.

4. The composite membrane according to claim 1, wherein surface grafting is a two-step polymerization.

5. The composite membrane according to claim 4, wherein in the first step, equal to or more than 5 mol % of halide containing monomers are used.

6. The composite membrane according to claim 5, wherein the halide containing monomer is 2-(2-bromoisobutyryloxy) ethyl acrylate or 2-(2-chloroisobutyryloxy) ethyl acrylate.

7. The composite membrane according to claim 5, wherein the second step is Atom Transfer Radical Polymerization through the halide containing monomers.

8. The composite membrane according to claim 4, wherein in the second step, monomers containing zwitterionic functional groups are used to form a grafting polymer.

9. The composite membrane according to claim 8, wherein the grafting density of the grafting polymer is equal to or more than 0.5 chains/nm$^2$.

10. The composite membrane according to claim 8, wherein the chain length of the grafting polymer is equal to or more than 100 units.

11. The composite membrane according to claim 8, wherein the content of zwitterionic functional groups in the grafting polymer is equal to or more than 10 wt %.

12. The composite membrane according to claim 1, wherein the composite film is applicable in the following applications: separation of peptides and protein; purification of human blood without Virus or Leukoecytes; separation of microbial from waste water; preservation, purification, concentration or separation of stem cells.

13. A low biofouling polymeric composite membrane, comprising:
    an activated fluorine-based substrate;
    a layer of branched polymer containing zwitterionic functional groups formed on the fluorine-based substrate via surface grafting wherein the layer of branched polymer is formed by firstly grafting chlorine-containing monomers and secondly grafting zwitterionic-group-containing monomer via surface-initiated atom transfer radical polymerization;
    wherein the grafting density of the grafting polymer is equal to or more than 0.3 chains/nm$^2$, the chain length of the grafting polymer is equal to or more than 50 units, the branched polymer is brush-like, and the zwitterionic functional groups are derived from one compound selected from the group consisting of: phosphobetaine, sulfobetaine, carboxylbetaine, and their derivatives.

* * * * *